United States Patent [19]

Bronner

[11] 4,197,433
[45] Apr. 8, 1980

[54] DEVICE FOR CONVEYING A HIGH-VOLTAGE LOW-FREQUENCY SIGNAL OVER A CARRIER CONNECTION

[75] Inventor: François Bronner, Fontenay le Fleury, France

[73] Assignee: Compagnie Industrielle des Telecommunications Cit-Alcatel, Paris, France

[21] Appl. No.: 865,554

[22] Filed: Dec. 29, 1977

[30] Foreign Application Priority Data

Dec. 29, 1976 [FR] France .................................. 76 39412

[51] Int. Cl.² .............................................. H04M 1/26
[52] U.S. Cl. .................................. 179/84 R; 179/2.51
[58] Field of Search ............. 179/84 R, 2.5 R, 15 FD, 179/15 FS; 325/184

[56] References Cited

U.S. PATENT DOCUMENTS 3,886,321  5/1975  Krasin et al. ........................ 179/84 R
3,927,266  12/1975  Stewart et al. ...................... 179/84 R Primary Examiner—Bernard Konick
Assistant Examiner—Joseph A. Popek
Attorney, Agent, or Firm—Sughrue, Rothwell, Mion, Zinn and Macpeak

[57] ABSTRACT

Ringing current is a high-voltage, low-frequency signal which is sent from a telephone exchange via a pair of wires to ring a bell in a distant telephone. It is becoming common practice for distant telephones to be connected via a carrier connection and the present invention provides a device for conveying a high-voltage low-frequency signal along such a carrier connection. The device comprises a sender part and a receiver part connected together by the carrier connection. The sender part on/off modulates one of the carrier frequencies used in the connection at twice the rate of the low-frequency signal. The receiver part detects the on/off modulation and uses it to connect alternate opposite voltages delivered by a voltage multiplier circuit to a line connected, for example, to a telephone bell.

9 Claims, 4 Drawing Figures

DEVICE FOR CONVEYING A HIGH-VOLTAGE LOW-FREQUENCY SIGNAL OVER A CARRIER CONNECTION

FIELD OF THE INVENTION

The present invention relates to telephony.

BACKGROUND OF THE INVENTION

A subscriber telephone set is generally connected to a telephone exchange by a physical connection constituted by a pair of electric conductors which is reserved for that set. Transmission between the subscriber telephone set and the telephone exchange takes place in the 300–3400 Hz voice band and occupies only a small part of the pass band of the pair. The lower end of this pass band is used for the transmission of a calling signal from the exchange towards the subscriber. This calling signal is a high-voltage low-frequency signal which activates a bell at the subscriber end without any auxiliary energy. The upper end of the pass band of the pair, which is left free by the telephone channel transmitted in the voice band and by the calling signal associated with said channel, can be used for carrier transmission of other telephone channels. This possibility is being used more and more for connecting new subscribers when there is no available pair between them and the telephone exchange. In this type of connection, the telephone channel intended for a new subscriber follows, by means of the carrier connection, a more or less long part of a pair already used for voice band transmission of the telephone channel of another subscriber.

The bell of a telephone subscriber connected to a telephone exchange via a carrier connection cannot be made to ring directly from the exchange. It must draw its power from the subscriber end of the carrier connection. It is generally in the form of an oscillator followed by a power amplifier which draws its power locally. The oscillator operates at the calling frequency; it is blocked or not blocked as a function of the presence or absence of a carrier frequency used in the carrier connection for the frequency transposition of the telephone channel in the exchange-to-subscriber direction.

This disposition has several drawbacks, in particular:

the necessity of using a low frequency output transformer (which is bulky and expensive) in the power amplifier;

the fact that the calling frequency is no longer determined by the telephone exchange but by equipment disposed at the subscriber ends of the carrier connections. This causes a dispersion of the calling frequencies about a rated value, and the dispersion cannot be reduced except by increasing precision or by requiring factory adjustment, which increases the cost of the local oscillator of each equipment. Further, the frequency of the calling signal varies according to the type of use, this also requires adjustment during use.

Preferred embodiments of the present invention avoid the above-mentioned drawbacks.

SUMMARY OF THE INVENTION

The present invention provides a device for conveying a high-voltage low-frequency signal from one end of a carrier connection to the other in response to a low-frequency signal applied at said one end of the carrier connection. The device comprises a sender part and a receiver part connected together by said connection. The sender part comprises a frequency doubler circuit receiving the low-frequency signal and supplying in response a double frequency signal.

A rectangular forming circuit is connected to the output of the frequency doubler circuit and supplies, when a signal is applied to the device, a rectangular signal having a frequency twice that of the applied signal.

A modulator interrupts one of the carrier frequencies used in the carrier connection for frequency transposition of the transmission signals at the rate of the signal delivered by the rectangular forming circuit. The receiver part comprises a detection circuit which is tuned to the carrier frequency which is interrupted by the modulation circuit and which restores the interrupting signal.

A divide by two frequency divider circuit is placed following the detection circuit, and delivers, when a signal is applied, a rectangular signal having the same frequency as that of the signal applied and a mark space ratio of one A voltage multiplier circuit supplies two DC voltages of opposite signs from one or several voltages which are not so high supplied by a power supply.

A switch is disposed following the voltage multiplier circuit, controlled by the frequency divider circuit and alternately switches, at the rate of the signal delivered by the frequency divider circuit, each of said voltages of opposite signs to the terminals of a line leading to the said other end of the carrier connection.

Other characteristics and advantages of the invention will become apparent from the accompanying claims and from the description hereinbelow of an embodiment given by way of an example. This description will be given with reference to the accompanying drawings.

DESCRIPTION OF THE PREFERRED EMBODIMENT

Figure 1:
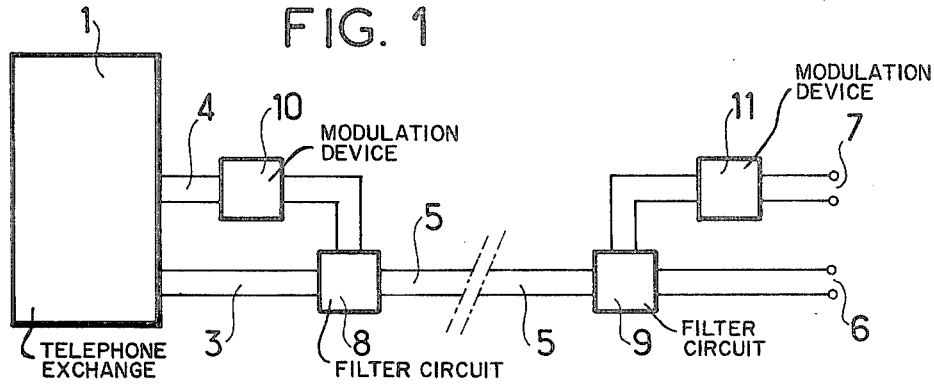
FIG. 1 is a block diagram showing two telephone subscriber connections to a telephone exchange, one of which uses a carrier connection.

The device which will be described enables the transmission of a calling signal from a telephone exchange towards a subscriber who is connected to it by a carrier connection. FIG. 1 shows a fairly general case of use of such a connection. Various lines leave the telephone exchange in the direction of telephone subscribers. Two inlets 3 and 4 have been shown. One (3) is connected by a physical connection i.e. a pair of electric conductors 5 to a telephone subscriber connected at 6. This is the most usual connection method. Both directions of the telephone channel occupy the voice band of 300–3400 Hz on the pair 5. The other inlet 4 is connected to a subscriber connected at 7 by means of a carrier connection using as the propagation medium the pair of conductors 5 already used as a physical connection between the inlet 3 and the subscriber connected at 6. The two directions of the telephone channel connected to the inlet 4 occupy distinct frequency bands on the pair 5 which are above the voice band already occupied by the telephone channel connected to the inlet 3. In the example described, the transmission direction of the telephone channel connected to the inlet 4 whose origin is the telephone exchange 1 and whose destination is the subscriber connected at 7 has its frequency transposed in the carrier connection by means of a carrier frequency whose transposition is 48 kHz, the other direction having its frequency transposed by means of a carrier frequency whose transposition is 24 kHz.

The carrier connection shows itself by the presence of filter circuits 8 and 9 at the ends of that section of the pair 5 which the connection follows. The filter circuits 8 and 9 separate the telephone channels from said pair, and the modulation devices 10 and 11 ensure the frequency transpositions required for both directions of transmission of the telephone channel connected to the inlet 4.

The telephone exchange 1 sends calling signals towards the subscribers from both of the inlets 3 and 4. These signals are identical for all the inlets and are constituted by an AC voltage of about 80 volts at a low frequency of 16⅔ or 25 or 50 Hz. In the case of a physical connection between the telephone exchange and a subscriber, the calling signal is transmitted by the pair of conductors without any appreciable loss and activates a bell placed at the subscriber end. In the case of a carrier connection between the subscriber and the exchange, the calling signal must be frequency transposed in order not to be mistaken for a calling signal associated with the telephone channel transmitted in the voice band on the pair of conductors which act as the propagation medium for the carrier connection. This frequency transposition makes it impossible for the exchange to transmit the power necessary for driving the bell at the subscriber end. This power must therefore be supplied by means of an auxiliary supply, for example by means of batteries disposed at the subscriber end of the carrier connection.

Figure 2:
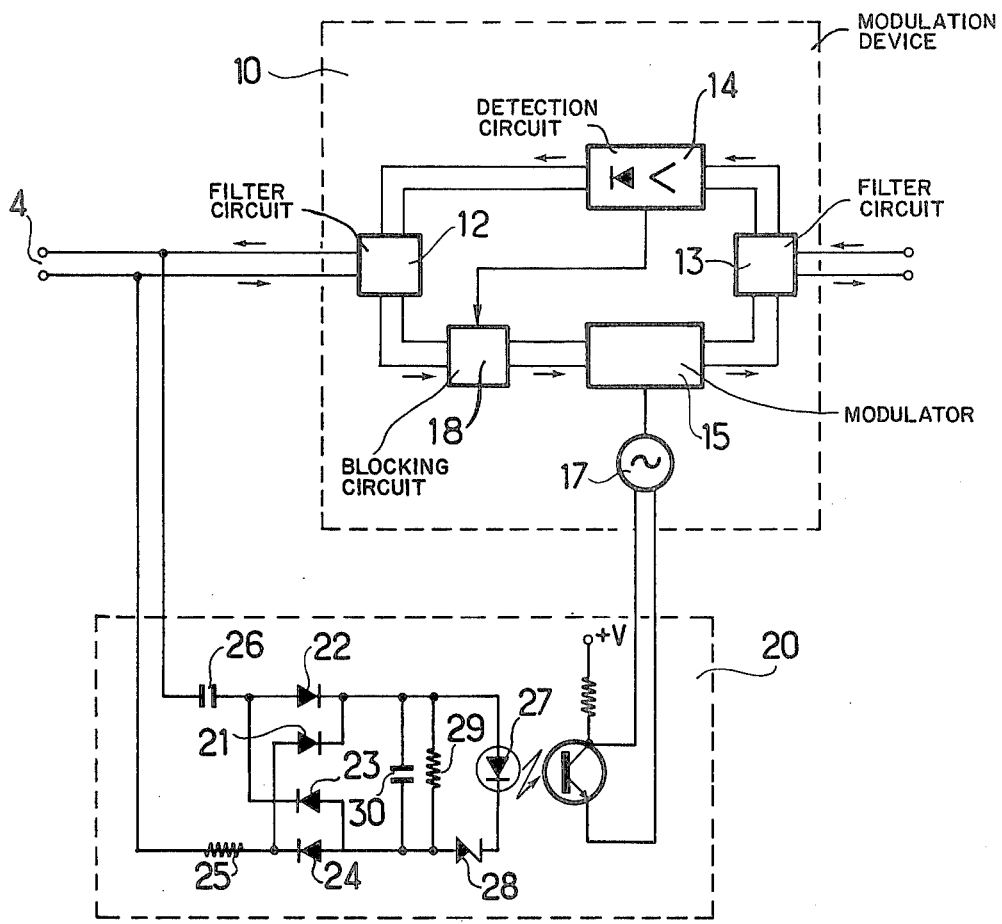
FIGS. 2 and 3 are circuit diagrams of the sender and receiver parts of a device according to the invention.
Figure 3:
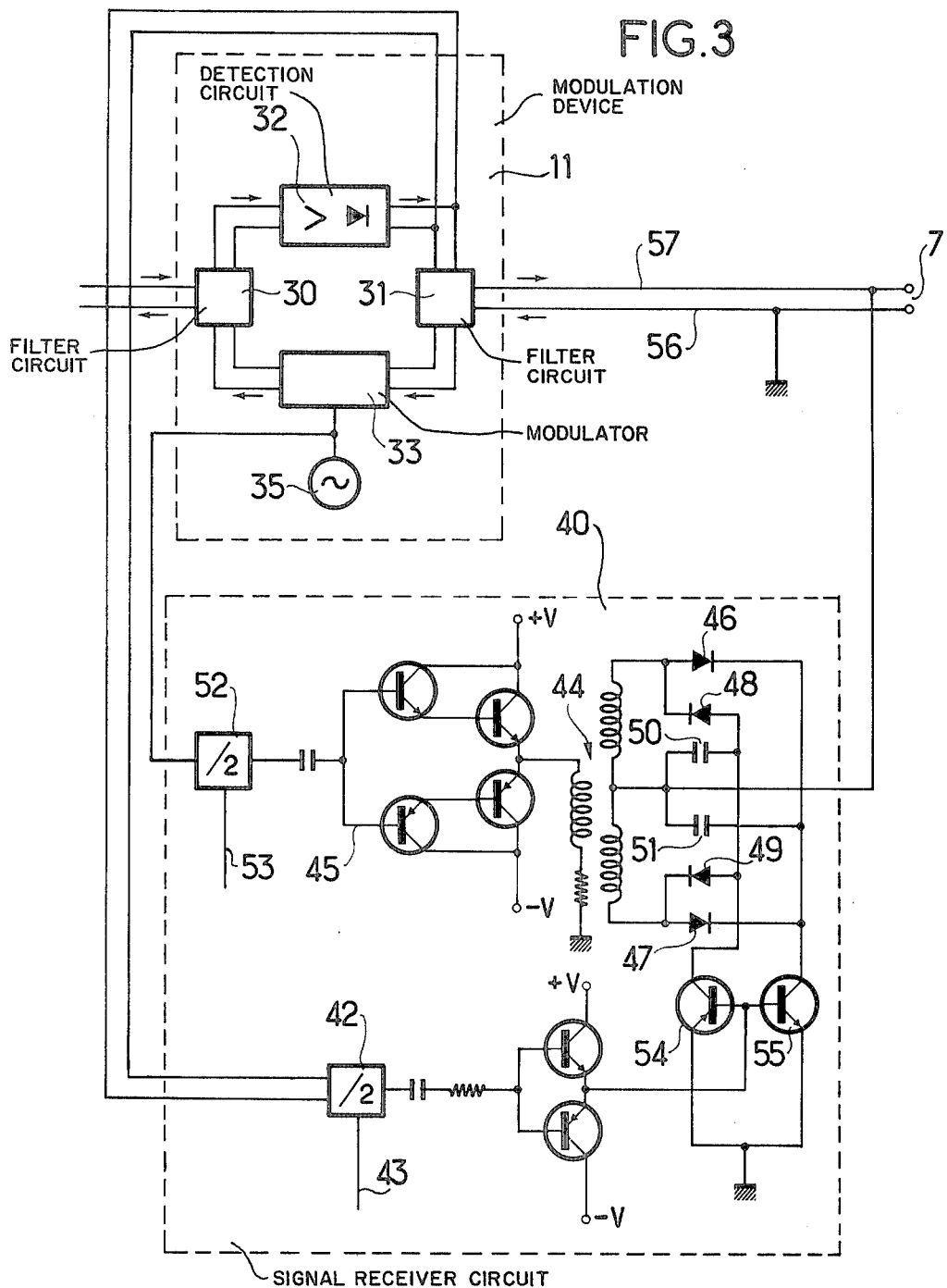

The transmission and reception circuits shown in FIGS. 2 and 3 allow: firstly, the conversion of the calling signal sent from the telephone exchange into a signal which can be transmitted by a carrier connection, and secondly, the detection of this latter signal and its use to generate a calling signal at the subscriber end and having the same frequency and voltage characteristics as that sent from the telephone exchange.

FIG. 2 shows the diagram of a transmission circuit as well as its disposition in relation to modulation equipment for the carrier connection. The modulation equipment 10 of the carrier connection is of a known type. It has been very summarily illustrated to show its interconnections with the transmission circuit. It is composed mainly of: two filter circuits 12 and 13 for separating the two transmission directions of the telephone channel; a modulator 15 in the send direction; and a detection circuit 14 in the receive direction disposed between the filter circuits 12 and 13 and providing the necessary frequency transpositions; and an oscillator 17 connected to the modulator 15 and supplying to the latter a carrier frequency.

In the transmission direction from the telephone exchange towards the subscriber, the available signals on the inlet 4 in the 300–3400 Hz voice band are directed by the filter circuit 12 towards the input of the modulator 15 where they are frequency transposed by means of a 48 kHz carrier wave supplied by the oscillator 17. At the output of the modulator 15, they are recombined with the signals of the other transmission direction by the filter circuit 13. At the output of the modulation equipment 10 they are injected by means of another filter circuit (8 FIG. 1) on the pair of conductors (5 FIG. 1) used as the propagation medium of the carrier connection.

In the transmission direction going from the subscriber to the telephone exchange, the signals coming from the subscriber (connected at 7 FIG. 1) which have been frequency transposed by means of a carrier wave at 24 kHz in the modulation equipment (11 FIG. 1) situated at the subscriber end reach the modulation equipment 10 via filter circuit 13. The latter circuit directs them towards the detection circuit 14 in order to recuperate the 300–3400 Hz voice band. At the output of the detection circuit 14, these signals are applied to the filter circuit 12 at the output of the modulation equipment 10 towards the inlet 4 of the telephone exchange 1.

The modulation equipment 10 also comprises a blocking circuit 18 disposed between the filter circuit 12 and the modulator 15 and controlled from the detection circuit 14 to inhibit the access of low-frequency signals to the modulator 15 when there is no 24 kHz carrier wave, the latter existing only when the carrier connected subscriber set is off hook. The presence of this blocking circuit 18 is justified by the great difference in level which exists between the transmission and the calling signals sent from the telephone exchange 1. When a calling signal is sent from the telephone exchange 1 via the inlet 4, the blocking circuit 18 operates and the modulator 15 which does not receive any signal from the filter circuit 12, transmits a pure sine wave constituted by the carrier wave supplied by the oscillator 17.

The transmission circuit of the calling signal proper is shown in FIG. 2 surrounded by a rectangle in dotted lines 20. It comprises mainly:

A frequency doubler circuit;
A rectangular shaping circuit;
An optical coupler; and
A modulator.

The frequency doubler circuit is formed by a full wave rectifying diode bridge 21, 22, 23 and 24 whose AC input is connected in parallel with the input-output of the modulation equipment 10 at the inlet 4 via a series circuit with a resistor 25 and a capacitor 26.

The capacitor 26 blocks a possible DC component and allows the rectification threshold to be fixed about the average zero value of the calling signal sent from the telephone exchange 1.

The resistor 25 enables the calling signal emission circuit to be given a high input impedance so as not to weaken the level of the transmission signals at the input of the modulation equipment 10.

The rectangular shaping circuit is constituted by a component with a voltage threshold, here, a Zener diode 28 connected in series with the input of the optical coupler and the rectified output of the diode bridge 21, 22, 23 and 24. It determines the operation threshold of the optical coupler and enables it to be made insensitive to low-level signals.

A resistor 29 and a capacitor 30 are also connected in parallel to the rectified output of the diode bridge 21, 22, 23 and 24 and are used to prevent the transmission of interference signals by the optical coupler.

The light emitting diode 27 of the optical coupler is connected in series with the Zener diode 28 to the rectified output of the diode bridge 21, 22, 23 and 24. Its output is connected to a control input for the modulation equipment 10 which makes it possible to block or not to block the oscillator 17 which supplies the 48 kHz carrier wave used for frequency transposition of the transmission signals in the carrier connection of the telephone line coming from the inlet 4. In co-operation with the filter circuit 12 of the modulation equipment 10, it isolates the exchange equipment from the line equipment to which a calling signal is applied.

The operation of the calling signal transmission circuit is as follows.

When there is no calling signal, the signals available on the inlet 4 of the telephone exchange 1 have an amplitude which is insufficient to unblock the Zener diode 28; the optical coupler does not transmit any signal and its output allows the oscillator 17 to function permanently. When there is a calling signal, the blocking circuit 18 placed at the input of the modulator 15 operates due to the fact that the subscriber has not gone offhook: the result of this is that the modulator 15 transmits integrally the signal which it receives from the oscillator 17.

When there is a signal, the calling signal rectified by the diode bridge 21, 22, 23 and 24 and put in rectangular form by the Zener diode 28, gives rise at the output of the optical coupler to a rectangular voltage having a double frequency, which is used to block and unblock the oscillator 17. The result of this is the emission from the output of the filter circuit 13 of the modulation equipment, of the 48 kHz carrier wave interrupted at a frequency twice that of the calling signal present on the inlet 4 of the telephone exchange.

Figure 4:
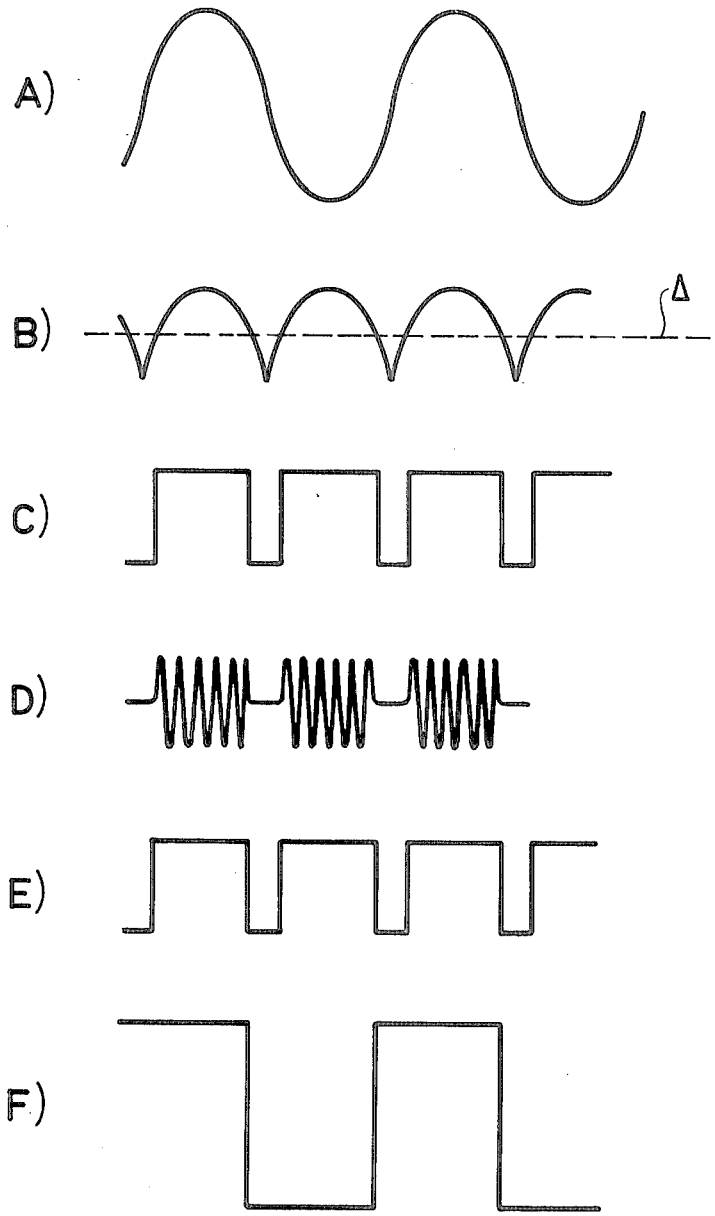
FIG. 4, including A–F, is a set of waveform diagrams showing, as a function of time, the waveforms of the signals at various points in the diagrams of FIGS. 2 and 3.

The waveforms A, B, C and D in FIG. 4 illustrate the form, as a function of time, of the signals available at various points of the transmission circuit which has just been described.

Waveform A represents a calling signal such as it appears on the inlet 4 of the telephone exchange. It is an AC voltage at a low frequency of 50 Hz with an amplitude of 80 volts.

Waveform B shows the form of the signal obtained on the rectified output of the diode bridge 21, 22, 23 and 24 when a calling signal is applied to the inlet 4. It is a rectified sine wave, the straight line Δ representing the threshold of the Zener diode 28.

Waveform C shows the form of the signal obtained at the output of the optical coupler when a calling signal is applied to the inlet 4. It is an assymmetrical rectangular signal whose transition instants correspond to the blocking and unblocking instants of the Zener diode 28. Its frequency is twice that of the calling signal sent from the telephone exchange 1.

Waveform D shows the form of the signal transmitted to line by the modulation equipment 10 when a calling signal is applied to the inlet 4. This signal is the signal of the oscillator 17 interrupted by the signal represented by waveform C.

FIG. 3 shows the diagram of the calling signal receiver circuit as well as its disposition in relation to the modulation equipment (11 FIG. 1) placed at the subscriber end of the carrier connection.

The modulation equipment 11 shown in FIG. 3 is of the same type as the modulation equipment 10 shown in FIG. 2. It likewise comprises: two filter circuits 30 and 31 for separating the two directions of the transmission, a modulator 33 and a detection circuit 32, disposed between the filter circuits 30 and 31 and ensuring the necessary frequency transpositions and an oscillator 35 connected to the modulator 33.

The operation of this modulation equipment 11 will not be given in detail, since it is similar to that already described with respect to the modulation equipment 10.

The calling signal receiver circuit is shown in FIG. 3 surrounded by a dotted line 40. It comprises mainly:

A divide by two frequency divider circuit;
A voltage multiplier; and
A switch.

The divide by two frequency divider 42 is connected to the output of the detection amplifier 32 of the modulation equipment 11. It is provided for example by means of a bistable flip-flop. When a calling signal is applied to the inlet 4 of the telephone exchange 1, the divider 42 provides a symmetrical rectangular signal having the same frequency as the calling signal and a mark-space ratio of one, this ratio improving efficiency. This device also enables distorsion to be eliminated which the line 5 may add to the signal generated by the modulation equipment 10 situated at the exchange (graph D, FIG. 4), and consequently to the signal detected at the subscriber end (waveform E, FIG. 4). The divider 42 also includes a blocking control 43 enabling the switch to be neutralized.

The voltage multiplier is formed from a frequency changer and two rectifying and filtering circuits.

The frequency changer includes a transformer 44 with a secondary winding whose centre tap provides the multiplied voltage. The primary winding of the transformer 44 constitutes the load of an amplifier 45 with complementary transistors which operates in class C and to where there is applied a high-frequency rectangular 12 kHz signal coming from a divide by 2 circuit 52. The amplifier 45 is fed by two symmetrical voltages $+V$, $-V$ supplied by a power supply which is in general provided by means of storage batteries disposed at the subscriber end of the carrier connection.

The relatively high frequency of 12 kHz at which the amplifier 45 operates enables the use of a transformer 44 with a light-weight ferrite core with small bulk.

Two full wave rectifying circuits each formed by pairs of diodes 46, 47 or 48, 49 are connected to the secondary winding with a centre tap of the transformer 44. The diode pairs are disposed in series and in opposition at the end of the secondary winding and connected by their junction point to the centre tap of the secondary winding by a filtering capacitor 50 or 51. The diodes 46, 47 of one of the rectifying circuits are disposed in the opposite direction to those 48, 49 of the other so as to obtain at their outputs voltages of opposite signs.

The operation frequency of 12 kHz used for driving the frequency changer is obtained from the 24 kHz frequency used as a transposition carrier frequency in the carrier connection for transmission of the signals originating at the subscriber end (connected at 7 FIG. 1) and whose destination is the inlet (4 FIG. 1) of the telephone exchange. This 24 kHz frequency is sampled in the modulation equipment 11 at the output of the oscillator 35 and subjected to a divide by two circuit 52. This frequency divider circuit 52 can be formed by a bistable flip-flop. It includes a blocking control unit 53 which is used for blocking the frequency changer when the carrier-connected subscriber goes off-hook.

The switch is formed by means of two complementary transistors 54 and 55. The one, 54, of PNP type, has its collector connected to the junction point of the anodes of the diodes 48 and 49 and its emitter connected via the earth to one of the conductors 56 of the line connecting the modulation equipment 11 to the subscriber connected at 7. Since the other conductor 57 of this line is connected to the centre tap of the secondary winding of the transformer 44, it enables; when it is conductive, the positive polarization of the conductor 57 in relation to the conductor 56. The other transistor 55 of NPN type has its collector connected to the junction points of the cathodes of the diodes 46 and 47 and its emitter connected, like the previous one, to one of the conductors 56 of the line connecting the modulation equipment 11 to the subscriber connected at 7. It enables, when it is conductive, the negative polarization of the conductor 57 in relation to the conductor 56. The bases of the two preceding transistors 54 and 55 are connected to the output of a pre-amplifier with complementary transistors whose input is connected via a resistor and a capacitor disposed in series, to the output of the frequency divider circuit 42.

Waveforms E and F in FIG. 4 illustrate the waveforms as a function of time of the signals available at various points of the reception circuit which has just been described.

The waveform E represents the form of the signal obtained at the output of the detection amplifier 32 when a calling signal is applied to the inlet 4 of the telephone exchange 1. It is an assymmetrical rectangular signal at twice the frequency of the calling signal and having the same form as the rectangular signal coming from the optical coupler in the signal transmission circuit, this signal being represented by the waveform C. However, as we have seen previously, this waveform may be deformed because of the distorsions caused by the line (5 FIG. 1).

The waveform F represents the form of the signal obtained at the output of the frequency divider circuit 42 placed after the circuit 32. It is a symmetrical rectangular signal having the same frequency as the calling signal sent from the telephone exchange. This rectangular signal is also found, but with a very much greater amplitude (60 volts) on the conductors 56 and 57 of the line connecting the modulation equipment 11 to the subscriber connected at 7 (FIG. 3).

The blocking control units of the frequency divider circuits 42 and 52 (FIG. 3) of the calling signal receiver circuit are used to block the frequency changer and the switch when the subscriber connected at 7 is off-hook.

The idle consumption of the calling signal receiver circuit is very low, since it is reduced to the consumption of the detection circuit and of the frequency dividers which can be formed by C.MOS circuits and to that of the transistors in the blocked state of the various amplifiers and of the switch.

The calling signal generated by the signal receiver circuit has a frequency which is determined by that sent out by the telephone exchange. It can be adjusted precisely to the same level as the calling signal emitted by the exchange by an appropriate choice of the turns ratio of the transformer 44.

The device which has just been described was described within the scope of an application in which it is used to transmit the calling signal sent from a telephone exchange via a carrier connection. But it is quite evident that it can be used more generally for the transmission to one end of a carrier connection of a high-voltage low-frequency signal in response to a low-frequency signal applied to the other end. Likewise, without going beyond the scope of the invention, some dispositions can be modified or some means can be replaced by equivalent means.

What is claimed is:

1. A device for conveying a high-voltage, low-frequency signal from one end of a carrier connection to the other end in response to a low-frequency signal applied at said one end of the carrier connection, said carrier connection normally transmitting transmission signals between said ends modulating at least one carrier wave, said device comprising: a sender part and a receiver part connected together by said connection, the sender part comprising:

a frequency doubler circuit receiving the low-frequency signal and supplying in response a signal having a frequency twice that of said received signal;

a rectangular wave forming circuit connected to the output of the frequency doubler circuit and supplying, when the low-frequency signal is applied to said doubler circuit, a rectangular signal having a frequency twice that of the received signal;

a modulator interrupting said carrier wave at the rate of the low-frequency signal delivered by the rectangular wave forming circuit; and said receiver part comprising:

a detection circuit which is tuned to said carrier wave which is interrupted by said modulator, said detection circuit providing a low-voltage signal corresponding to said low-frequency signal delivered by the rectangular wave forming circuit;

a divide by two frequency divider circuit connected to the output of the detection circuit and delivering, when a low-voltage signal is received, a rectangular signal having half the frequency as that of the low-voltage received signal and a mark space ratio of one;

a voltage increasing circuit supplying two DC voltages of opposite signs from at least one voltage which is less than said two DC voltages and applied by a power supply;

a switch connected to the output of the voltage increasing circuit, controlled by the frequency divider circuit and alternately switching, at the rate of the signal delivered by the frequency divider circuit, each of said DC voltages of opposite signs to the terminals of a line leading to said other end of the carrier connection.

2. A device according to claim 1, wherein the frequency doubler circuit comprises a full wave rectifier bridge.

3. A device according to claim 1, wherein the rectangular forming circuit comprises a voltage threshold element.

4. A device according to claim 1, wherein the sender part also comprises an optical coupler which is inserted between the rectangular forming circuit and the modulator and which ensures electric isolation therebetween.

5. A device according to claim 1, wherein the voltage increasing circuit comprises a frequency changer driven by said carrier wave and two rectifier and filtering circuits disposed in parallel on the output of the frequency changer and supplying said DC voltages of opposite signs.

6. A device according to claim 5, wherein a first carrier wave is modulated at said one end by transmission signals and a second carrier wave is modulated at said other end by transmission signals, the frequency changer being driven by said second carrier wave.

7. A device according to claim 1, wherein the divide by two frequency divider circuit is provided with a blocking control unit making it possible to prevent the sending of the high-voltage, low-frequency signal.

8. A device according to claim 1, including between the frequency doubler circuit and the rectangular forming circuit an electric filter formed by a resistor and a capacitor connected in parallel.

9. A device according to claim 1, wherein a first carrier wave is modulated at said one end by transmission signals and a second carrier wave is modulated at said other end by transmission signals, the modulator interrupting, at the rate of the signal delivered by the rectangular wave forming circuit, said first carrier wave.

* * * * *